3,128,295
PERIODATE OXIDATION OF OXAZOLINES
Herbert L. Wehrmeister, Terre Haute, Ind., assignor to Commercial Solvents Corporation, New York, N.Y., a corporation of Maryland
No Drawing. Filed May 31, 1961, Ser. No. 113,665
6 Claims. (Cl. 260—410.9)

My invention relates to a process for making acyloxyketones, acyloxyaldehydes, and acyloxyalkanoic acids and more particularly, making these compounds from 2-oxazolines.

Periodate oxidations have long been known. Many experimenters in the course of studying periodate oxidations have published information regarding their work. Thus, the relative unreactivity towards periodate oxidation of such products as acylated glycols, N-acylated amino alcohols, and tertiary amino alcohols is known (see L. Palfray, A. Halasz, and S. Rovira, Compt. Rend. 210, 765–7 (1940); Chem. Abstr. 35, 4350 (1941) and B. H. Nicolet, and L. A. Shinn, J. A. C. S. 61, 1615 (1939)) Ethanolamine and diethanolamine are quantitatively oxidized by periodic acid. As in the case of glycols, only those amino alcohols with the functional groups attached to adjacent carbon atoms are normally oxidized. Acetylation of the amino group prevents oxidation. Since N-acylated amino alcohols and tertiary amino alcohols are relatively not oxidized by periodic acid, one would not expect 4-α-hydroxyalkyl-2-oxazolines to be oxidizable.

I have found that 4-α-hydroxyalkyl-2-oxazolines are quantitatively oxidized by periodic acid. This finding was surprising and unexpected in view of the heretofore known limitations of periodate oxidation. My new method for making acyloxyketones, acyloxyaldehydes, and acyloxyalkanoic acids involves periodate oxidation of 4-α-hydroxyalkyl-2-oxazolines.

Very generally my process consists of interacting the 4-α-hydroxyalkyl-2-oxazoline with aqueous periodate. The interaction involves contacting the periodate with the oxazoline. The most convenient manner of accomplishing this is by shaking a container containing the two reactants.

I can start with oxazolines of the following structure:

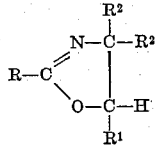

R can be alkyl or aryl; $R^1$ can be H or alkyl; and $R^2$ can be H, alkyl, phenyl, or α-hydroxyalkyl, with the proviso that at least one $R^2$ must be alkyl with a hydroxy substitution in the alpha position.

Some examples of oxazolines that I can use are:

2-ethyl-4-hydroxymethyl-4-methyl-2-oxazoline,
2-phenyl-4-hydroxymethyl-4-methyl-2-oxazoline,
2-ethyl-4-hydroxymethyl-2-oxazoline,
2-heptadecenyl-4,4-bis(hydroxymethyl)-2-oxazoline,
2,4-dimethyl-4-α-hydroxyethyl-2-oxazoline,
2,4,5-trimethyl-4-α-hydroxyethyl-2-oxazoline,
2-heptadecenyl-4-ethyl-4-hydroxymethyl-2-oxazoline,
2,4-dimethyl-5-ethyl-4-α-hydroxypropyl-2-oxazoline,
2-ethyl-4,4-bis(hydroxymethyl)-2-oxazoline,
2-phenyl-4,4-bis(hydroxymethyl)-2-oxazoline,
2-ethyl-4-hydroxymethyl-4-α-hydroxyethyl-5-methyl-2-oxazoline,
2-ethyl-4-d-hydroxyethyl-5-methyl-2-oxazoline,
2-p-chlorophenyl-4,4-bis(hydroxymethyl)-2-oxazoline,
2-ethyl-4,4-bis(α-hydroxyethyl)-2-oxazoline, etc.

When the 4 position of the oxazolines that I use is substituted with two α-hydroxyalkyl groups, the products of my periodic oxidation will be acyloxyalkanoic acids. Some examples of acyloxyalkanoic acids that I can produce are: acetoxyacetic acid, propionyloxyacetic acid, stearoyloxyacetic acid, benzoxyacetic acid, 2-propionyloxypropionic acid, etc.

When the 4 position of the oxazolines that I use is substituted with one α-hydroxyalkyl group and one alkyl group, the products of my periodic oxidation will be acyloxyketones. Some examples of acyloxyketones that I can produce are: acetoxyacetone, propionyloxymethyl ethyl ketone, 1-stearoyloxyethyl ethyl ketone, p-chlorobenzoxyacetone, 1-benzoxypropyl methyl ketone, acetoxymethyl phenyl ketone, etc.

When the 4 position of the oxazolines that I use is substituted with one α-hydroxyalkyl group and one hydrogen atom, the products of my periodic oxidation will be acyloxyaldehydes. Some examples of acyloxyaldehydes that I can produce are: acetoxyacetaldehyde, benzoxyacetaldehyde, stearoyloxyacetaldehyde, 2-propionyloxypropionaldehyde, etc.

One mole of periodic acid is consumed for each α-hydroxyalkyl group present in position 4 of the oxazoline ring. When one of the 4-position substituents is not an α-hydroxyalkyl radical, greater amounts of periodic acid are consumed than would be thought required. This extra consumption which proceeds at a very slow rate is undoubtedly due to the partial hydrolysis of the primary oxidation product to hydroxyalkylketones and hydroxyalkylaldehydes which are oxidizable with periodic acid.

The rate of the periodate oxidation of 4-α-hydroxyalkyl-2-oxazolines under standardized conditions depends in part on the substituent present in position 2 of the oxazoline ring. Those oxazolines containing a lower alkyl group in position 2 are completely oxidized in a short period of time (about 2 hours), while those with a phenyl group require a longer period of time (approximately 24 hours).

Besides periodic acid, I have found that I can conduct the periodate oxidation of my invention with other commonly-known sources of periodate. For example, I can use sodium metaperiodate, trisodium periodate, potassium periodates, and other suitable salts of periodic acid, as well as crystalline paraperiodic acid.

I normally use water as a solvent but other solvents can, of course, be used as long as some water is present.

The oxazolines that I use in my process were prepared by the reaction of either appropriate anhydride or acid with the appropriate amino alcohol by refluxing in a solvent with azeotropic removal of water. The liquid products were purified by distillation, and the solid products by recrystallization.

The products of my process have a great variety of uses. Many can be used as intermediates for various chemical syntheses and some are useful without any further modification. For example, acetoxyacetic acid can be reacted with allyl alcohol to form allyl acetylglycolate according to the following reaction:

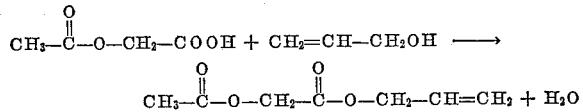

Allyl acetylglycolate is a valuable plasticizer for polymers or copolymers of vinyl chloride.

Another example wherein a compound of my novel process is utilized as an intermediate in chemical synthesis is the reaction of acetoxyacetone with hydroxylamine to form acetoxy-2-propanoneoxime according to the following reaction:

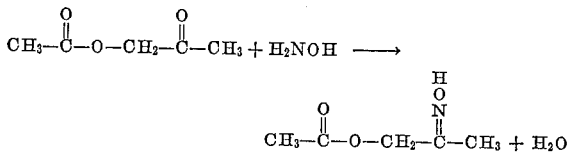 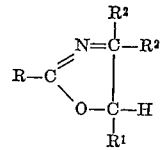

Acetoxy-2-propanone oxime is described as an effective repellant against salt-marsh mosquitos.

An example of a compound produced by the process of my invention that can be used without any modification is stearoyloxyacetic acid, which is useful as a corrosion-inhibitor in turbine oils. Stearoyloxyacetic acid is made from 2-heptadecenyl-4,4-bis(hydroxymethyl)-2-oxazoline. Benzoxyacetaldehyde can be produced by reacting 2-phenyl-4-hydroxymethyl-2-oxazoline with periodic acid.

The following examples are offered to illustrate my invention; however, I do not intend to be limited to the specific procedures, proportions, or materials disclosed. Rather, I intend to include within the scope of this invention, all equivalents obvious to those skilled in the art.

*Example I*

A 19-gram portion of 2-phenyl-4-methyl-4-hydroxymethyl-2-oxazoline, produced by the reaction of benzoic acid with 2-amino-2-methyl-1,3-propanediol with azeotropic removal of water, was added to a solution of 25 grams of periodic acid in 100 milliliters of water. The mixture was shaken mechanically for 24 hours at room temperature. The mixture was then diluted with 200 milliliters of water, neutralized with bicarbonate solution and extracted with four 100 milliliter portions of benzene. The dried benzene extract was distilled. Benzoxyacetone was collected at 100–103° C./1 mm. The amount of benzoxyacetone collected was 14.1 grams for an 80% yield.

*Example II*

A 10.5-gram portion of 2-phenyl-4,4-bis(hydroxymethyl)-2-oxazoline, produced by the reaction of benzoic acid with tris-(hydroxymethyl)-aminomethane with azeotropic removal of water, was added to a solution of 25 grams of periodic acid in 250 milliliters of water. The mixture was shaken mechanically for 24 hours at room temperature. The mixture was then cooled in a refrigerator for three hours and filtered. The dried white solid weighed 8.5 grams and melted at 104–106° C. Recrystallization of this material from water yielded 5.0 grams of benzoxyacetic acid which had a melting point of 111–111.5° C.

Now having described my invention, what I claim is:
1. A process for the production of acyloxyketones, acyloxyaldehydes and acyloxyalkanoic acids which comprises reacting 4-α-hydroxyalkyl-2-oxazolines of the formula:

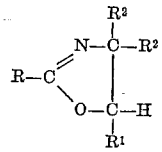

wherein R is a member selected from a group consisting of alkyl, phenyl and chlorophenyl; $R^1$ is a member selected from a group consisting of H and alkyl; and $R^2$ is a member selected from the group consisting of H, alkyl, phenyl, and α-hydroxyalkyl, with the proviso that at least one $R^2$ must be an alkyl with a hydroxy substitution in the alpha position; with periodate to oxidize the oxazoline.

2. A process for the production of acyloxyketones, acyloxyaldehydes and acyloxyalkanoic acids which comprises reacting 4-α-hydroxyalkyl-2-oxazolines of the formula:

wherein R is a member selected from a group consisting of alkyl, phenyl and chlorophenyl; $R^1$ is a member selected from a group consisting of H and alkyl; and $R^2$ is a member selected from the group consisting of H, alkyl, phenyl, and α-hydroxyalkyl, with the proviso that at least one $R^2$ must be an alkyl with a hydroxy substitution in the alpha position; with a reactant selected from a group consisting of periodic acid, paraperiodic acid, sodium metaperiodate, trisodium periodate, and potassium periodate.

3. A process for the production of benzoxyacetone which comprises reacting 2-phenyl-4-methyl-4-hydroxymethyl-2-oxazoline with periodic acid.

4. A process for the production of benzoxyacetic acid which comprises reacting 2-phenyl-4,4-bis(hydroxymethyl)-2-oxazoline with periodic acid.

5. A process for the production of benzoxyacetaldehyde which comprises reacting 2-phenyl-4-hydroxymethyl-2-oxazoline with periodic acid.

6. A process for the production of stearoyloxyacetic acid by reacting 2-heptadecenyl-4,4-bis(hydroxymethyl)-2-oxazoline with periodic acid.

References Cited in the file of this patent

Kolthoff et al.: Volumetric Analysis, III (New York, 1957), page 477.